(12) United States Patent
Tsai et al.

(10) Patent No.: US 9,520,057 B2
(45) Date of Patent: Dec. 13, 2016

(54) WIRELESS REMOTE MONITORING OF CRITICAL FACILITIES

(71) Applicant: UChicago Argonne, LLC, Chicago, IL (US)

(72) Inventors: Hanchung Tsai, Darien, IL (US); John T. Anderson, Elburn, IL (US); Yung Y. Liu, Hinsdale, IL (US)

(73) Assignee: UChicago Argonne, LLC, Chicago, IL (US)

( * ) Notice: Subject to any disclaimer, the term of this patent is extended or adjusted under 35 U.S.C. 154(b) by 233 days.

(21) Appl. No.: 14/305,504

(22) Filed: Jun. 16, 2014

(65) Prior Publication Data

US 2014/0375274 A1    Dec. 25, 2014

Related U.S. Application Data

(60) Provisional application No. 61/836,724, filed on Jun. 19, 2013.

(51) Int. Cl.
*G08C 17/00* (2006.01)
*G08C 17/02* (2006.01)
(Continued)

(52) U.S. Cl.
CPC .............. *G08C 17/02* (2013.01); *H04L 12/10* (2013.01); *H04L 12/413* (2013.01);
(Continued)

(58) Field of Classification Search
None
See application file for complete search history.

(56) References Cited

U.S. PATENT DOCUMENTS 8,013,744 B2    9/2011  Tsai et al.
9,147,144 B2 *  9/2015  Potyrailo ........... G06K 19/0717
(Continued)

FOREIGN PATENT DOCUMENTS

EP    1894145 B1    1/2009
EP    2124171 B1    1/2012

OTHER PUBLICATIONS

P. Constantinou et al., "A mechanical battery for powering wireless sensor nodes in harsh environments," 2010 Proc. of SPIE vol. 7645, 12 pages.*

(Continued)

*Primary Examiner* — Leigh Garbowski
(74) *Attorney, Agent, or Firm* — Joan Pennington

(57) ABSTRACT

A method, apparatus, and system are provided for monitoring environment parameters of critical facilities. A Remote Area Modular Monitoring (RAMM) apparatus is provided for monitoring environment parameters of critical facilities. The RAMM apparatus includes a battery power supply and a central processor. The RAMM apparatus includes a plurality of sensors monitoring the associated environment parameters and at least one communication module for transmitting one or more monitored environment parameters. The RAMM apparatus is powered by the battery power supply, controlled by the central processor operating a wireless sensor network (WSN) platform when the facility condition is disrupted. The RAMM apparatus includes a housing prepositioned at a strategic location, for example, where a dangerous build-up of contamination and radiation may preclude subsequent manned entrance and surveillance.

20 Claims, 5 Drawing Sheets

(51) Int. Cl.
  H04L 12/10 (2006.01)
  H04L 12/413 (2006.01)
  *H02J 7/00* (2006.01)
  *G21C 17/00* (2006.01)
  *H02J 7/35* (2006.01)

(52) U.S. Cl.
  CPC ......... *G08C 2201/10* (2013.01); *G21C 17/00* (2013.01); *H02J 7/0042* (2013.01); *H02J 7/0055* (2013.01); *H02J 7/35* (2013.01)

(56) References Cited

U.S. PATENT DOCUMENTS

| | | |
|---|---|---|
| 2006/0006987 A1 | 1/2006 | Hashimoto et al. |
| 2006/0265193 A1 | 11/2006 | Wright et al. |
| 2008/0180935 A1 | 7/2008 | Burdeen et al. |
| 2009/0207770 A1* | 8/2009 | Fayfield ................... H04Q 9/00 370/311 |
| 2011/0161051 A1 | 6/2011 | Vander Linden et al. |

OTHER PUBLICATIONS

R. Aryaeinejad et al., "Network-Oriented Radiation Monitoring System (NORMS)," 2007 IEEE Nuclear Science Symposium Conference Record, pp. 1120-1124.*

J.V. Cordaro et al., "Ultra Secure High Reliability Wireless Radiation Monitoring System," IEEE Instrumentation & Measurement Magazine, Dec. 2011, pp. 14-18.*

R. Gomaa et al., "ZigBee Wireless Sensor Network for Radiation Monitoring at Nuclear Facilities," IFIP WMNC'2013, IEEE, 4 pages.*

R. Lin et al., "Wireless Sensor Networks Solutions for Real time Monitoring of Nuclear Power Plant," Proc. of the 5th World Congress on Intelligent Control and Automation, 2004 IEEE, pp. 3663-3667.*

H.C. Tsai et al., "Applying RFID technology in nuclear materials management," Packaging, transport, Storage & Security of Radioactive Material, 2008, vol. 19, No. 1, pp. 41-46.*

H. Tsai et al., "Monitoring Plant Conditions with Radio Frequency Devices," Transactions of the American Nuclear Society, vol. 106, Jun. 24-28, 2012, pp. 157-158.*

H. Tsai et al., "Advanced Surveillance Technologies for Used Fuel Long-Term Storage and Transportation," Proc. of the ASME 2011 14th Int'l Conference on Environmental remediation and Radioactive Waste Management, pp. 1-8.*

A. Somov et al., "Deployment and Evaluation of a wireless sensor network for methane leak detection," Sensors and Actuators A 202 (2013), pp. 217-225.*

C. Salvatore et al., "WSN and RFID Integrated Solution for Advanced Safety Systems in Industrial Plants," 2012 20th Int'l Conference on Software, Telecommunications and Computer Networks (SoftCOM), 5 pages.*

Z. Rongbai et al., "Research on Majot Hazard Installations Monitoring System Based on WSN," 2010 2nd Int'l Conference on Future Computer and Communication, IEEE, vol. 1, pp. 741-745.*

A.M. Mielke et al., "Independnet Sensor Networks," IEEE Instrumentation & Measurement Magazine, Jun. 2005, pp. 33-37.*

R. Jurdak et al., "Multi-hop RFID Wake-up Radio: Design, Evaluation and Energy Tradeoffs," 2008 IEEE, pp. 1-8.*

K. Chen et al, "Development of the RFID System for Nuclear Materials Management," Proc. 49th INMM Meeting, 2008, 7 pages.*

W. Chen et al., "Design of Multi-interface Wi-Fi node for Sensor Network," 2011 IEEE, pp. 3902-3905.*

J. Anderson et al., "Tracking and Monitoring with Dosimeter-Enabled ARG-US RFID System," Proc. Waste Management Symposia 2012, pp. 1-9.*

H. Tsai et al., "Monitoring Critical Facilities by Using Advanced RF Devices," Proc. of the ASME 2013 15th Int'l Conference on Environmental Remediation and Radioactive Waste Management, pp. 1-7.*

H. Tsai et al., "Remote Area Modular Monitoring (RAMM) for Nuclear and Radiological Facilities," Trans. of the American Nuclear Society, 2015, pp. 144-147.*

Tsai et al., Advanced Surveillance Technologies for Used Fuel Storage and Transportation, ASTM International C26.13 Workshop on Spent Fuel Disposal, Avignon, France, Jun. 20, 2013, 16 pages.

Ding et al., "A GPS-enabled wireless sensor network for monitoring radioactive materials", Sensors and Actuators A 155 (2009) pp. 210-215.

H. M. Hashemian et al., "Wireless Sensor Applications in Nuclear Power Plants", Nuclear Technology vol. 173, Jan. 2011.

Nathan Carl Rowe, Thesis "Distributed Radiation Monitoring via a Secure Wireless Sensor Platform", University of Tennessee—Knoxville, 12, 2008.

* cited by examiner

WIRELESS REMOTE MONITORING OF CRITICAL FACILITIES

This application claims benefit of Provisional Application Ser. No. 61/836,724 filed Jun. 19, 2013.

CONTRACTUAL ORIGIN OF THE INVENTION

The United States Government has rights in this invention pursuant to Contract No. W-31-109-ENG-38 between the United States Government and The University of Chicago and/or pursuant to Contract No. DE-AC02-06CH11357 between the United States Government and UChicago Argonne, LLC representing Argonne National Laboratory.

FIELD OF THE INVENTION

The present invention relates to a method, apparatus, and system for monitoring environment parameters of critical facilities, for example, facilities containing radioactive and fissile materials.

DESCRIPTION OF THE RELATED ART

The ability to monitor environment parameters of critical facilities at all times, particularly after a disruptive accident, is vital for the safety of facility personnel, rescue and recovery crew, and the surrounding communities.

Conventional hard-wired assets that depend on supplied power may be decimated due to such events, as witnessed in the Japanese Fukushima nuclear power plants in March 2011.

U.S. Pat. No. 8,013,744 to Hanchung Tsai and Yung Y. Liu, issued Sep. 6, 2011, and assigned to the present assignee, discloses an enhanced method and apparatus are provided for tracking and managing a plurality of packagings, particularly packagings containing radioactive and fissile materials. A radio frequency identification (RFID) surveillance tag is provided with an associated packaging. The RFID surveillance tag includes a tag body and a back plate including predefined mounting features for mounting the surveillance tag to the associated packaging. The RFID surveillance tag includes a battery power supply. The RFID surveillance tag includes a plurality of sensors monitoring the associated packaging including a seal sensor. The seal sensor includes a force sensitive material providing a resistivity change responsive to change in a seal integrity of the associated packaging. The resistivity change causes a seal integrity tag alarm. A tag memory stores data responsive to tag alarms generated by each of the plurality of sensors monitoring the associated packaging.

SUMMARY OF THE INVENTION

Principal objects of the present invention are to provide a method, apparatus, and system for monitoring environment parameters of critical facilities, for example, facilities containing radioactive and fissile materials. Important aspects of the present invention are to provide such method, apparatus, and system substantially without negative effect and that overcome some of the disadvantages of prior art arrangements.

In brief, a method, apparatus, and system are provided for monitoring environment parameters of critical facilities. A Remote Area Modular Monitoring (RAMM) apparatus is provided for monitoring environment parameters of critical facilities. The RAMM apparatus includes a battery power supply and a central processor unit. The RAMM apparatus includes a plurality of sensors monitoring the associated environment parameters and at least one communication module for transmitting one or more monitored environment parameters. The RAMM apparatus is powered by the battery power supply, controlled by the central processor unit operating on a wireless sensor network (WSN) platform responsive to a facility condition being disrupted. The RAMM apparatus is prepositioned at a strategic location, for example, where a dangerous build-up of contamination and radiation may preclude subsequent manned entrance and surveillance.

In accordance with features of the invention, the central processor unit intelligently switches automatically from one communication mode to another communication mode when the condition of the critical facility changes. The central processor unit provides communication over a wired network when the condition of the facility is normal.

In accordance with features of the invention, when the condition of the facility is normal, a wired connection to the RAMM apparatus is used to provide battery charging. Backup charging optionally is implemented for example with one or more photovoltaic cells.

In accordance with features of the invention, the operation of the RAMM apparatus exerts minimal load on the battery power supply. A Power-over-Ethernet (PoE) passes electrical power along with data communication on Ethernet cabling, allowing a single cable to provide both data connection and electrical power, and allowing long cable lengths.

In accordance with features of the invention, the RAMM apparatus including the plurality of sensors, includes specialty sensors for $\beta$-$\gamma$ radiation, neutrons, hydrogen gas, temperature, humidity, water level, as well as imaging equipment for heat, video, and the like that are prepositioned at strategic locations, for continuously monitoring contamination and radiation during normal operation and when the facility condition is disrupted.

In accordance with features of the invention, the RAMM apparatus is adapted for extended use in an environment of radioactive and fissile materials.

In accordance with features of the invention, the RAMM apparatus can provide vital surveillance information for assessing the extent of critical facility damage, mandating responses when necessary, for example, evacuation before impending hydrogen explosion, and enabling overall safe and efficient recovery in a disaster.

In accordance with features of the invention, each sensor module including one or more of the plurality of sensors monitoring the associated environment parameters and each communication module is independently connected to the power supply through a power switch so that if one block fails or begins to draw excessive current it is turned off by the central processor. This enables maintained operation after a module is damaged and also is used to manage overall power consumption.

In accordance with features of the invention, when the condition of the facility is normal, a wired connection, such as a wired Ethernet connection to the RAMM apparatus is used to provide a reliable normal mode of communication, in addition to power required to keep the battery power supply charged by Power-over-Ethernet (PoE).

In accordance with features of the invention, the RAMM apparatus includes a housing, such as a sturdy metal box containing the battery power supply, central processor, and the plurality of sensors monitoring the associated environment parameters and at least one communication module, and carrying at least one wired communication connection, such as an Ethernet connection, and one wireless communication connection with an antenna.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

In accordance with features of the invention, a method, apparatus, and system are provided for monitoring environment parameters of critical facilities. The apparatus, and system typically is equipped with specialty sensors for β-γ radiation, neutrons, criticality, hydrogen gas, temperature, humidity, water level, as well as imaging equipment for heat, video, and others, that provide vital surveillance information for assessing the extent of facility or plant damage, mandating responses when necessary, for example evacuation before impending hydrogen explosion, and enabling overall safe and efficient recovery in a disaster.

In accordance with features of the invention, the RAMM apparatus includes self-powered monitoring devices or battery operated sensors that are operatively arranged to survive a disruptive event or calamity and remain functional, operating on the wireless platform during and after the disruptive event. Conventional hard-wired sensors may be inoperable when most needed during a disruptive event or calamity.

Advantages of the application of the RAMM apparatus of the invention in nuclear materials management and facility operation are enhanced safety and security, reduced need for manned surveillance, real-time access of status and history data, and overall cost-effectiveness. The RAMM apparatus of the invention is adapted to provide adequate resistance to radiation, and extensive battery life under battery powered operation.

In accordance with features of the invention, the RAMM apparatus includes a background monitoring normal mode of operation where measurement of monitored parameters are taken and stored at regular intervals; and the crisis response mode of operation. The RAMM apparatus includes a backup charging methodology such as a power-over-Ethernet input or charging from photovoltaic cells.

Figure 1:
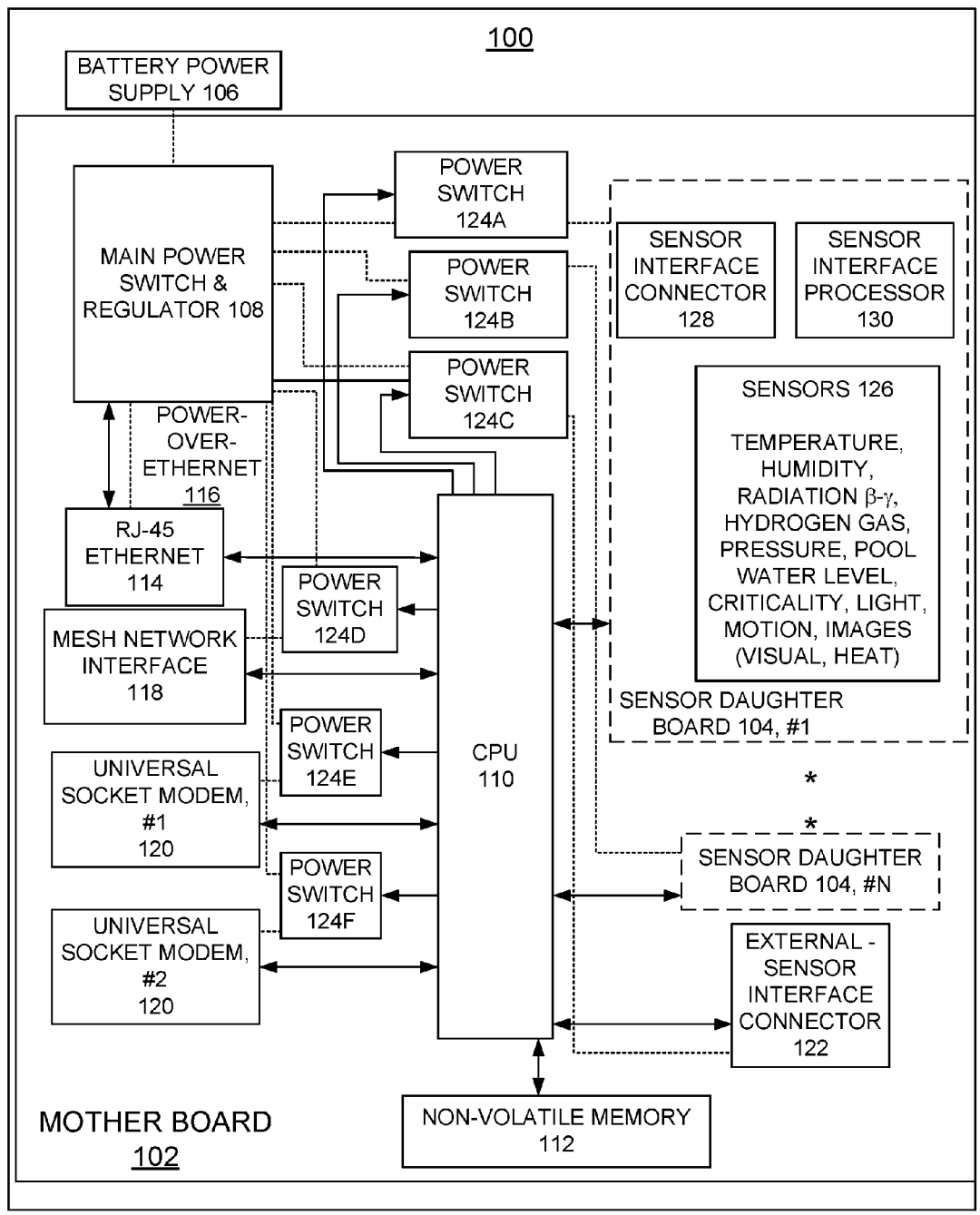
FIG. 1 is a schematic and block diagram representation of an example Remote Area Modular Monitoring (RAMM) apparatus in accordance with the preferred embodiment.

Having reference now to the drawings, in FIG. 1 there is shown an Remote Area Modular Monitoring (RAMM) apparatus of the invention generally designated by the reference character 100 for monitoring environment parameters of critical facilities in accordance with a preferred embodiment. The RAMM apparatus 100 includes a mother board 102, and a plurality of sensor daughter boards 104, #1-#N. The RAMM apparatus includes a battery power supply 106 coupled to a main power switch and regulator 108, for example, provided on the mother board 102, as shown. The RAMM apparatus 100 is powered by the battery power supply 106 operating on a wireless communication platform when the facility condition is disrupted.

In accordance with features of the invention, the RAMM apparatus 100 is prepositioned at a strategic location, for example, where a dangerous build-up of contamination and radiation may preclude subsequent manned entrance and surveillance.

The RAMM apparatus 100 includes a central processor unit (CPU) 110 provided on the mother board 102, as shown, for operatively controlling the monitoring of environment parameters of a critical facility. A non-volatile memory 112 is provided with the CPU 110.

The RAMM apparatus 100 includes, for example, a standard RJ-45 Ethernet connector 114 providing a power-over-Ethernet input 116 to the main power switch and regulator 108 to maintain a fully charged battery power supply 106 during normal operation. As shown the RAMM apparatus 100 optionally includes a plurality of communication interfaces 118, 120, such as a mesh network interface 118, one or more universal socket modems 120, #1, #2, and an external sensor interface connector 122.

In accordance with features of the invention, the operation of the RAMM apparatus 100 exerts minimal load on the battery power supply 106. The Power-over-Ethernet (PoE) input 116 passes electrical power along with data on Ethernet cabling, allowing a single cable to provide both data connection and electrical power, and allowing long cable lengths.

Each sensor daughter boards 104, #1-#N of the RAMM apparatus 100 includes one or more sensors 126 monitoring the associated environment parameters and at least one sensor interface connector 128, and at least one sensor interface processor 130 connected to the CPU 110, used for transmitting one or more monitored environment parameters. Connections to internal sensor daughter boards 104 and to communication interfaces 114, 118, 120, 122 typically use standard board-to-board pin-and-socket connections.

Each sensor interface processor 130 independently monitors, controls and collects information from its sensor or sensors 126, and the CPU 110 functions as a communications processor that collect packets of sensor information, store the results in non-volatile memory 112, transmit collected sensor data to external systems and receive commands from the external computer system. Each sensor interface processor 130 is responsible for monitoring alarm thresholds specific to its sensor or sensors 126. The CPU 110 is alerted by the sensor interface processor 130 of any alarm condition, for example via interrupt.

CPU 110 optionally is implemented with a general-purpose, non-volatile flash-based microcontroller/microprocessor with sufficient serial I/O to communicate with a minimum of three sensor interface processors 130 plus two plug-in communications interfaces plus an Ethernet port at the same time. Each sensor interface processor 130 is configured to collect data from each sensor 126 to which it is connected at regular, programmable intervals; monitor each sensor for alarm conditions and interrupt communications processor when an alarm condition exists; store collected sensor data into a local non-volatile (flash) memory (not shown); and transmit data from its flash memory to the CPU 110 upon request. Each sensor interface processor 130 is configured to receive control packets from CPU 110 and adjust operational parameters based upon the data in these packets. The sensor interface processor 130 interprets the control packets uniquely and specifically based upon the program within the sensor interface processor 130. For example, the CPU 110 receives and forwards control packets to sensor interface processor 130 from the external control program and the CPU 110 also processes received control packets targeted to the CPU 110. For example, the control packets received by CPU 110 include a field within the control packet defining the destination address of the packet within the RAMM apparatus 100, which the CPU 110 decodes to forward the packet to the indicated destination or CPU 110 processes the packet. Due to the generic nature of the sensor interface processor 130 and the wide variety of sensors 126 that are used, the sensor interface processor 130 is implemented with a full feature microprocessor with a wide mix of internal peripherals that can interface to each sensor 126.

It should be understood that other modules, such as the mesh network interface 118, one or more universal socket modems 120, #1, #2 may have control parameters that the external control program may wish to monitor or adjust. An example of such a control parameter adjustment includes an amount of RF transmission power to use. In this case, CPU 110 receives the control packet of the currently selected communication interface, and forwards the command to an appropriate other-object.

In accordance with features of the invention, the RAMM apparatus advantageously includes multiple sensors 126, including specialty sensors 126 for β-γ radiation, neutrons, criticality, hydrogen gas, temperature, humidity, water level, as well as imaging equipment for heat, video, and the like are prepositioned at strategic locations, for continuously monitoring contamination and radiation during normal operation and when the facility condition is disrupted. The RAMM apparatus is adapted for extended use in an environment of radioactive and fissile materials.

It should be understood that the present invention is not limited to the examples provided for the multiple sensors 126 and various other sensors can be included with the RAMM apparatus 100. For example, sensors 126 are not limited to a hydrogen sensor 126 may include other types of gas sensors.

Each sensor daughter board or module 104 including one or more of the plurality of sensors 126 monitoring the associated environment parameters, and each communication module 118, 120, #1-#2, is independently connected to the battery power supply 106, and main power switch and regulator 108 through a respective power switch 124A, 124B, 124C, and a respective power switch 124D, 124E, and 124F is connected to respective WSN mesh network interface 118, and respective universal socket modem 120, #1-#2 so that if a particular module or block fails or begins to draw excessive current it is turned off by the central processor 110. In FIG. 1, power connections within apparatus 100 are indicated by dotted lines, and solid lines illustrate signal flow in the apparatus 100 with direction indicated by arrow. This enables maintained operation after a particular module 104, 118, 120, 122 is damaged and also advantageously is used to manage overall power consumption.

In operation of the RAMM apparatus 100, when the condition of the facility is normal, a wired connection, such as the wired Ethernet connection 114 to the RAMM apparatus is used to provide a reliable normal mode of communication, in addition to power required to keep the battery power supply charged by Power-over-Ethernet (PoE) 116. When external power or Ethernet connection is disrupted, the RAMM apparatus or wireless communication modules 100 in the unit would take over and form a mesh network with gateways to the outside world, for example, as illustrated and described with respect to FIG. 3. The RAMM apparatus 100 provides vital surveillance information for assessing the extent of critical facility damage, mandating responses when necessary, for example, evacuation before impending hydrogen explosion, and enabling overall safe and efficient recovery in a disaster. The mesh network, when initiated, typically organizes itself based upon communications available when the mesh is formed.

Figure 2:
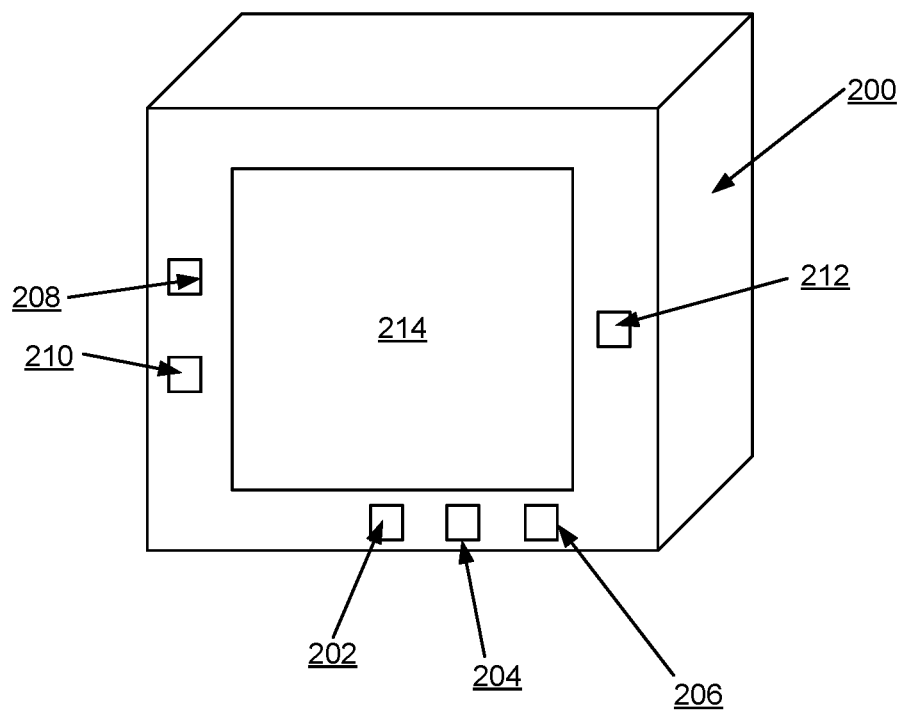
FIG. 2 is a schematic representation of an example housing of the Remote Area Modular Monitoring (RAMM) apparatus of FIG. 1 in accordance with the preferred embodiment.

Referring to FIG. 2, there is shown an example housing generally designated by the reference character 200 of the RAMM apparatus 100 in accordance with the preferred embodiment. The RAMM apparatus 100 includes the RAMM housing 200, such as a sturdy metal box containing the mother board 102 including the central processor 110, the plurality of daughter boards 104, #1-#N including sensors 126 monitoring the associated environment parameters, the battery power supply 106, and one or more communication modules 114, 118, 120.

The components of the RAMM apparatus 100 contained within the RAMM housing 200 generally are based on flash memory circuits as opposed to EEPROM in order to provide a modicum of radiation tolerance; however, no electronic circuit is proof against radiation damage.

The enclosure RAMM housing 200 includes a minimum of openings, although clearly some penetrations for cooling, photo-sensors, radio wave transmission and perhaps certain gas/radiation sensors are provided.

As shown, the example RAMM housing 200 carries a plurality of connectors 202, 204, 206, 208, 210, an antenna 212, and an optional photovoltaic device 214 coupled to the battery power supply 116. For example the connectors 202, 204, 206, 208, 210 include, for example, one or more communication connections 202, 204, 206, 208, 210 such as an Ethernet connection or another selected data transfer connection, and a mesh wireless sensor network (WSN) connection.

Figure 3:
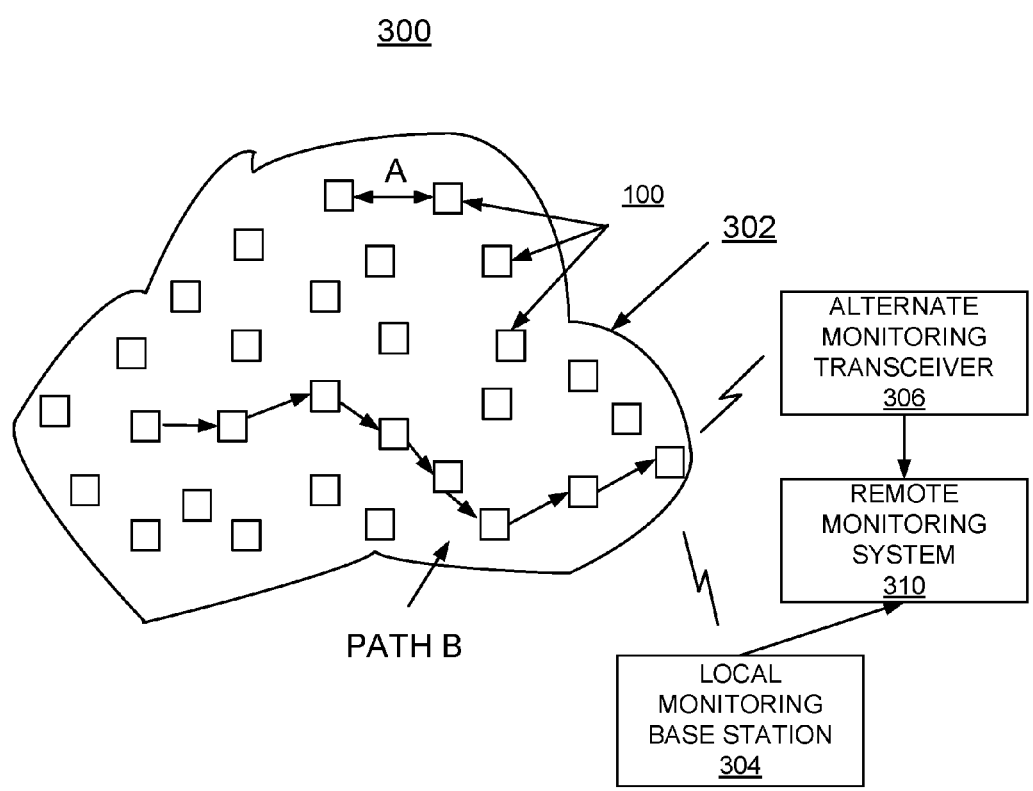
FIG. 3 schematically illustrates not to scale an example operation and arrangement of radio frequency Remote Area Modular Monitoring (RAMM) apparatus of FIG. 1 in accordance with the preferred embodiment.

Referring to FIG. 3, there is shown example operation and a mesh wireless sensor network (WSN) platform generally designated by the reference character 300 of the RAMM apparatus 100 in accordance with the preferred embodiment. The WSN platform 300 includes a plurality of the modular RAMM apparatus 100 provided within a critical facility area 302. For example, it is possible that a separation indicated by an arrow labeled A is provided between the plurality of the modular RAMM apparatus 100, such as a separation A of about 100 meters. However, it should be understood that a maximum usable separation may be different than about 100 meters depending on local conditions; for example, the maximum usable separation may be greater outdoors than indoors, where some obstacles such as walls are located.

The WSN platform 300 includes a plurality of paths, such as a path B indicated by arrows connecting a first RAMM apparatus 100 to a different RAMM apparatus. Each RAMM apparatus 100 includes, for example, a store and forward communication control for multi-hop forming a plurality of paths within the WSN platform 300 connecting the RAMM apparatus 100 within the critical facility area 302.

At least one of a local monitoring base station 304 or an alternate monitoring transceiver 306 is provided with the WSN platform 300 connecting the RAMM apparatus 100 within the critical facility area 302. A remote monitoring system 310 is provided with the local monitoring base station 304, and/or the alternate monitoring transceiver 306.

In accordance with features of the invention, the RAMM apparatus 100 includes the mesh wireless sensor network (WSN) platform or infrastructure. The network topology allows the monitoring units or nodes defined by the RAMM apparatus 100 to communicate with their nearby neighbors and relay the collected information. The nodes are judiciously arranged in such a way that multiple routing paths are available for use between nodes, to maintain effective operation if some individual RAMM apparatus 100 or units 100 providing links suffer damage due to the disruptive event. Although all nodes of the RAMM apparatus 100 may be largely identical and having similar data acquisition, processing and transmission capabilities, some of the nodes are configured as routers that take on additional functions. One such function is used to form a wireless multi-hop ad hoc backbone.

In accordance with features of the invention, the RAMM apparatus 100 is self-configuring and self-healing, if a router RAMM apparatus 100 becomes defunct, a nearby node of the RAMM apparatus 100 automatically takes over these duties to ensure no loss of system reliability. Near the edge of the network of WSN platform 300, some of the nodes of the RAMM apparatus 100 advantageously are given additional communication capabilities, such as GSM cellular communication module and Iridium satellite modems, to function as the gateways provided with the RAMM apparatus 100 to the outside world, such as the offsite command center of remote monitoring system 310 for crisis management.

For example, the mesh network or mesh WSN typically can be formed by communication between the nodes of the RAMM apparatus 100. Non-gateway nodes listen for and seek connection with a gateway node. All non-gateway nodes that can establish communication with the gateway do so and then broadcast that they may provide a store-and-forward connection to the gateway. Nodes that fail to connect directly to a gateway may then connect to a node that succeeded. This process repeats until the mesh is fully formed. After initial construction the gateway then re-organizes the network for optimal performance.

The operating frequency for the RAMM wireless system provided with the WSN platform 300 connecting the RAMM apparatus 100 optionally includes the established 2.45-GHz ZigBee/Industrial-Scientific-Medical (ISM) band. With ZigBee operating frequency band, up to ≈100 m of transmission range can be expected which is adequate for a carefully laid-out mesh network within the critical facility area 302.

Figure 4:
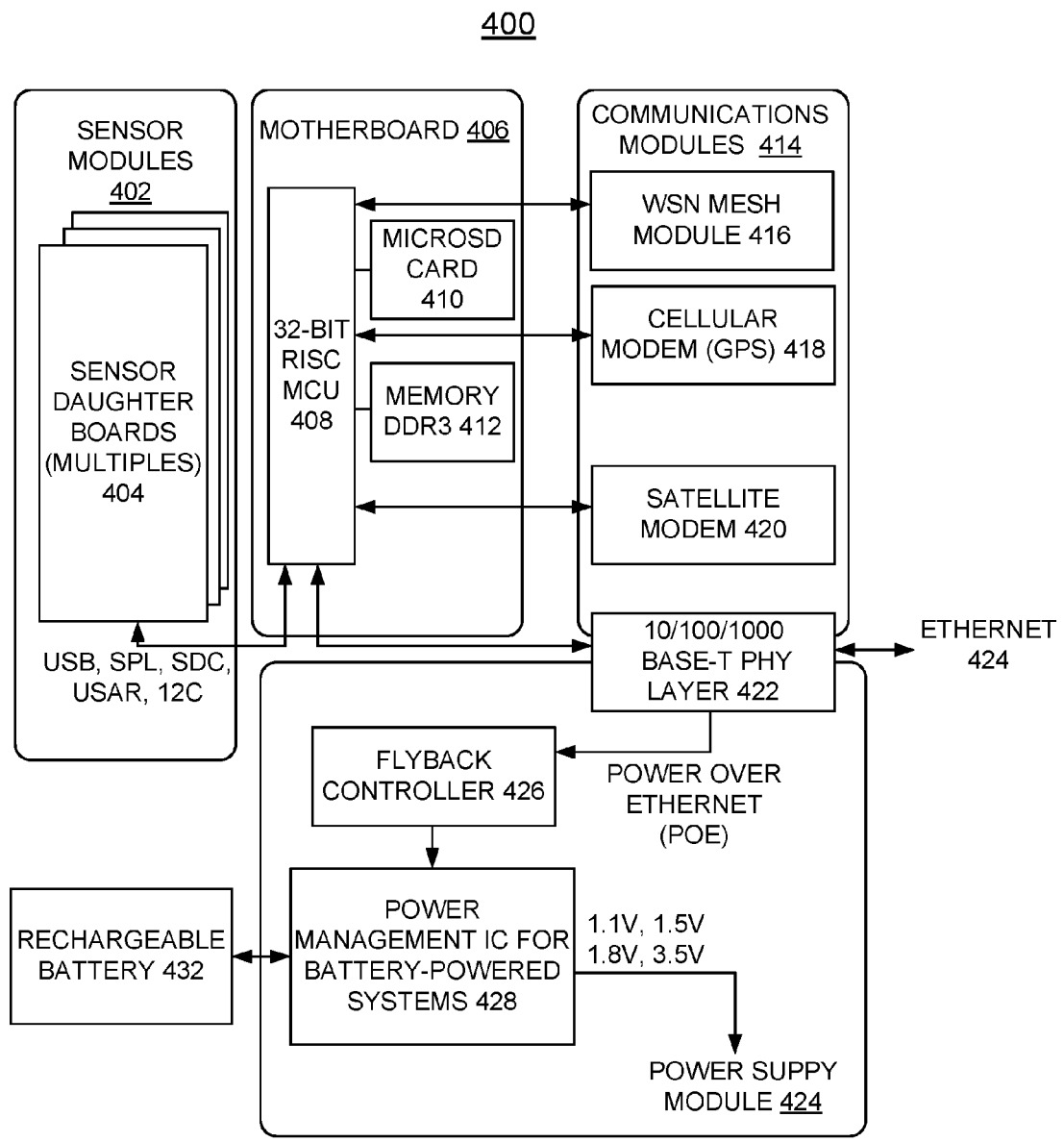
FIG. 4 illustrates another example Remote Area Modular Monitoring (RAMM) unit in accordance with the preferred embodiment.

Referring to FIG. 4, there is shown another example Remote Area Modular Monitoring (RAMM) unit of the invention generally designated by the reference character 400 for monitoring environment parameters of critical facilities in accordance with a preferred embodiment. RAMM unit 400 includes a plurality of sensor modules 402, each including one or more sensor daughter boards 404, each connected to a motherboard 406. The motherboard 406 of RAMM unit 400 includes a microcontroller (MCU) 408, such as a 32 bit reduced instruction set computer (RISC) MCU, a microSD card 410, and a memory 412, such as a DRR3 dynamic random access memory (DRAM). RAMM unit 400 includes a plurality of communications modules 412, each optionally including a WSN mesh module 416, a cellular modem (GPS) 418, and a satellite modem 420, such as anlridium satellite modem, together with a 10/100/1000 BASE-T physical layer Ethernet card 422 for the wired network or Ethernet 424. The 10/100/1000 BASE-T physical layer Ethernet card 422 provides power over ethernet (POE) applied to a flyback controller 426 operatively connected to a power management IC 428 for battery-powered systems of a power supply module 430, providing multiple voltages, for example, 1.1 V, 1.5 V, 1.8 V, 3.5V and connected to a rechargeable battery 432 to keep the rechargeable battery charged at all times.

Figure 5:
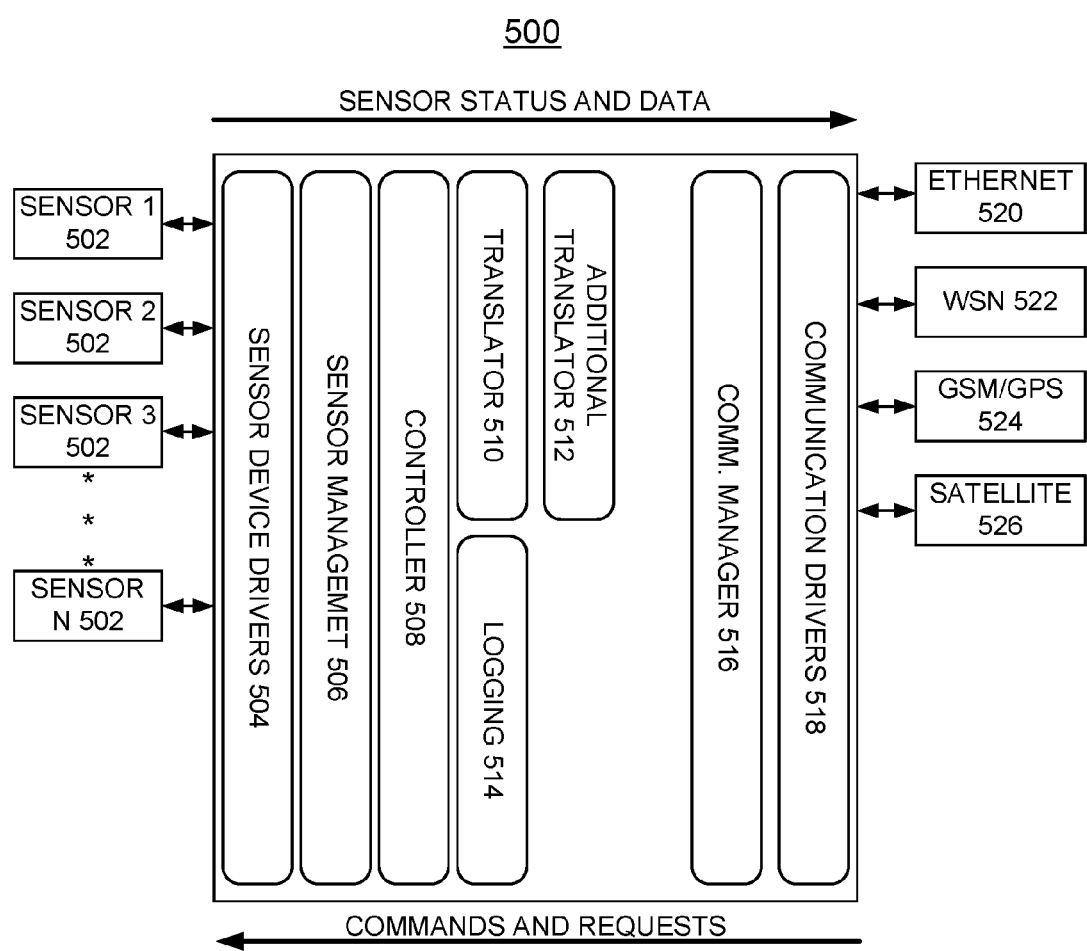
FIG. 5 illustrates example onboard Remote Area Modular Monitoring (RAMM) software in accordance with the preferred embodiment.

Referring to FIG. 5, there is shown example onboard Remote Area Modular Monitoring (RAMM) software of the invention generally designated by the reference character 500 for monitoring environment parameters of critical facilities in accordance with a preferred embodiment. RAMM software 500 sends sensor status and data, receiving commands and request in accordance with a preferred embodiment.

RAMM software 500 is provided with bidirectional connections to multiple sensors 502 including multiple sensor device drivers 504, sensor management functions 406, a controller 508, provided with one or more translators 510, 512 for translating sensor data, and logging 514 for logging of sensor data with an external server to store and display collected information. The additional translator 512 enables different encryption/authentication methods to be implemented depending on the application, without modifying the base RAMM software 500. RAMM software 500 includes a communications manager 516, and communications drivers 518, shown provided with bidirectional connections to Ethernet 520, WSN 522, GSM/GPS 524 and satellite 526.

It should be understood that the present invention is not limited to the examples provided by the illustrated RAMM apparatus 100, RAMM housing 200, the WSN platform 300 connecting the RAMM apparatus 100 within the critical facility area 302, RAMM unit 400, or the RAMM software 500; various other configurations and arrangements can be provided within the scope of the invention.

While the present invention has been described with reference to the details of the embodiments of the invention shown in the drawing, these details are not intended to limit the scope of the invention as claimed in the appended claims.

What is claimed is:

1. A Remote Area Modular Monitoring (RAMM) apparatus for monitoring environment parameters of critical facilities comprising:
   a central processor unit;
   a battery power supply coupled to said central processor unit;
   a plurality of sensors monitoring respective environment parameters;
   a wired Ethernet connection providing a normal mode of communication transmitting one or more monitored environment parameters and providing a normal mode of power to keep the battery power supply charged by Power-over-Ethernet (PoE);
   a housing containing said central processor unit, said battery power supply, said wired Ethernet connection and at least some of said plurality of sensors, and said housing being prepositioned at a selected strategic location for monitoring the respective environment parameters in a critical facility;
   a wireless sensor network (WSN) platform including multiple wireless modules contained in said housing for controllably transmitting one or more monitored environment parameters;

said central processor switching to said wireless sensor network (WSN) platform with said at least one of said multiple wireless modules being powered by said battery power supply and controlled by said central processor for operating on said wireless sensor network (WSN) platform responsive to a disruptive event in said critical facility.

2. The RAMM apparatus as recited in claim 1 includes a system including a plurality of said RAMM apparatus in said critical facility, and wherein each said RAMM apparatus of said plurality of RAMM apparatus being linked to a different RAMM apparatus by said WSN platform within said critical facility including an environment of radioactive and fissile materials.

3. The RAMM apparatus as recited in claim 2 wherein each said RAMM apparatus being linked to a different RAMM apparatus by said WSN platform includes a plurality of predefined paths linking each said RAMM apparatus to said different RAMM apparatus.

4. The RAMM apparatus as recited in claim 1 wherein said wired Ethernet connection includes a wired connection to a main power switch and regulator to provide battery charging of said battery power supply responsive to a normal condition of the facility.

5. The RAMM apparatus as recited in claim 1 includes a sensor module including one or more of said plurality of sensors monitoring the respective environment parameters and a power switch independently connecting said sensor module to said battery power supply.

6. The RAMM apparatus as recited in claim 1 wherein said plurality of sensors monitoring respective environment parameters includes a selected sensor for monitoring at least one of β-γ radiation, neutrons, hydrogen gas, temperature, and humidity.

7. The RAMM apparatus as recited in claim 1 includes a power switch coupled to said central processor unit, said power switch independently connecting at least one of said multiple wireless modules contained in said housing to said battery power supply, said power switch being turned off by said central processor unit.

8. The RAMM apparatus as recited in claim 1 includes a sensor module including one or more of said plurality of sensors monitoring the respective environment parameters and a power switch coupled to said central processor unit and independently connecting said sensor module to said battery power supply, said power switch being turned off by said central processor unit.

9. The RAMM apparatus as recited in claim 8 wherein said sensor module includes a sensor interface processor connected to one more of said plurality of sensors, and configured to collect data from each connected sensor at regular, programmable intervals; and monitor each connected sensor for alarm conditions and interrupt said central processor unit when an alarm condition is identified.

10. The RAMM apparatus as recited in claim 8 wherein said sensor module includes a sensor interface connector for connecting said sensor interface processor to said one more of said plurality of sensors and to said central processor unit.

11. The RAMM apparatus as recited in claim 1 includes a sensor module includes a sensor daughter board including a sensor interface processor monitoring one more of said plurality of sensors and a sensor interface connector connecting said sensor interface processor to said one more of said plurality of sensors and to said central processor unit.

12. The RAMM apparatus as recited in claim 11 includes a mother board carrying said central processor unit and said sensor interface connector connecting said sensor daughter board to said mother board.

13. The RAMM apparatus as recited in claim 1 wherein said plurality of sensors monitoring respective environment parameters includes an imaging sensor for visual monitoring.

14. The RAMM apparatus as recited in claim 1 includes a Power-over-Ethernet (PoE) connection to said central processor unit to provide battery charging of said battery power supply responsive to a normal condition of said critical facility.

15. The RAMM apparatus as recited in claim 14 wherein said Power-over-Ethernet (PoE) connection provides data connection for a normal mode of communication.

16. The RAMM apparatus as recited in claim 1 wherein said housing includes a metal enclosure.

17. The RAMM apparatus as recited in claim 16 wherein said housing carries an antenna and at least one communication connection.

18. A method for monitoring environment parameters of critical facilities using a Remote Area Modular Monitoring (RAMM) apparatus, said method comprising:
providing a central processor unit;
providing a battery power supply coupled to said central processor unit;
providing a wired Ethernet connection for transmitting one or more monitored environment parameters with a normal mode of communication and providing a normal mode of power to keep the battery power supply charged by Power-over-Ethernet (PoE);
providing a plurality of sensors monitoring respective environment parameters;
providing a housing containing said central processor unit, said battery power supply, and at least some of said plurality of sensors; and said housing being prepositioned at a selected strategic location for monitoring the respective environment parameters in a critical facility;
providing a wireless sensor network (WSN) platform including multiple wireless modules contained in said housing for controllably transmitting one or more monitored environment parameters; and
controlling at least one of said multiple wireless modules by said central processor for operating on said wireless sensor network (WSN) platform responsive to a disruptive event in said critical facility.

19. The method as recited in claim 18 includes providing electrical power battery charging of said battery power supply together with data communication on Ethernet cabling responsive to a normal facility condition.

20. The method as recited in claim 18 includes independently connecting each of said plurality of sensors and said at least one communication module to said battery power supply by a respective power switch.

* * * * *